United States Patent
Schoen et al.

(10) Patent No.: US 8,613,981 B2
(45) Date of Patent: Dec. 24, 2013

(54) METHODS FOR PRODUCING COMPOSITE ELEMENTS BASED ON FOAMS BASED ON ISOCYANATE

(75) Inventors: Lars Schoen, Nordhorn (DE); Roland Fabisiak, Brockum (DE); Rainer Hensiek, Melle (DE); Peter Huntemann, Stemshorn (DE); Ruediger Viereck, Quernheim (DE); Maria Thomas, Muehlen (DE); Bernd Schaper, Diepholz (DE)

(73) Assignee: BASF SE, Ludwigshafen (DE)

( * ) Notice: Subject to any disclaimer, the term of this patent is extended or adjusted under 35 U.S.C. 154(b) by 676 days.

(21) Appl. No.: 12/808,570

(22) PCT Filed: Dec. 15, 2008

(86) PCT No.: PCT/EP2008/067517
§ 371 (c)(1),
(2), (4) Date: Jun. 16, 2010

(87) PCT Pub. No.: WO2009/077490
PCT Pub. Date: Jun. 25, 2009

(65) Prior Publication Data
US 2011/0003082 A1 Jan. 6, 2011

(30) Foreign Application Priority Data
Dec. 17, 2007 (EP) .................................... 07150059

(51) Int. Cl.
*B05D 1/30* (2006.01)
(52) U.S. Cl.
USPC ........... 427/420; 118/313; 118/314; 118/324; 222/478; 239/550; 239/551; 427/244; 427/247; 427/421.1; 427/427.4

(58) Field of Classification Search
USPC ........... 118/315, 324; 222/478; 239/550, 551; 427/243, 244, 247, 421.1
See application file for complete search history.

(56) References Cited

U.S. PATENT DOCUMENTS 4,201,321 A * 5/1980 Patzelt et al. ................. 222/478
4,945,854 A * 8/1990 Nicola et al. ................. 118/324
(Continued)

FOREIGN PATENT DOCUMENTS

DE  42 25 618  2/1994
DE  197 41 523  4/1998
(Continued)

OTHER PUBLICATIONS

International Search Report issued Feb. 5, 2010 in PCT/EP08/067517 filed Dec. 15, 2008.
U.S. Appl. No. 13/131,270, filed May 26, 2011, Schmit, et al.

*Primary Examiner* — Alexander Weddle
(74) *Attorney, Agent, or Firm* — Oblon, Spivak, McClelland, Maier & Neustadt, L.L.P.

(57) ABSTRACT

The invention relates to a process for the production of composites, composed of at least one outer layer b) and of an isocyanate-based rigid foam a), where the outer layer b) is moved continuously and the starting material for the isocyanate-based rigid foam a) is applied to the outer layer b), which comprises achieving the application of the liquid starting material for the isocyanate-based rigid foam a) by means of at least one fixed tube c) which has openings f) and which has been placed, with respect to the outer layer b), so as to be parallel to the plane of the outer layer and at right angles to the direction of movement.

25 Claims, 1 Drawing Sheet

(56) References Cited

U.S. PATENT DOCUMENTS

| | | |
|---|---|---|
| 5,264,036 A | 11/1993 | Haas et al. |
| 6,520,547 B2 * | 2/2003 | Robinson ................. 285/330 |
| 2005/0222289 A1 | 10/2005 | Miller |
| 2006/0153991 A1 * | 7/2006 | Winter et al. ............. 427/421.1 |
| 2007/0246160 A1 * | 10/2007 | Calgua et al. ............. 156/331.7 |

FOREIGN PATENT DOCUMENTS

| | | |
|---|---|---|
| DE | 197 57 678 | 6/1999 |
| EP | 0 770 466 | 5/1997 |
| GB | 1 596 464 | 8/1981 |
| WO | 00 69571 | 11/2000 |
| WO | 2006 029786 | 3/2006 |

* cited by examiner

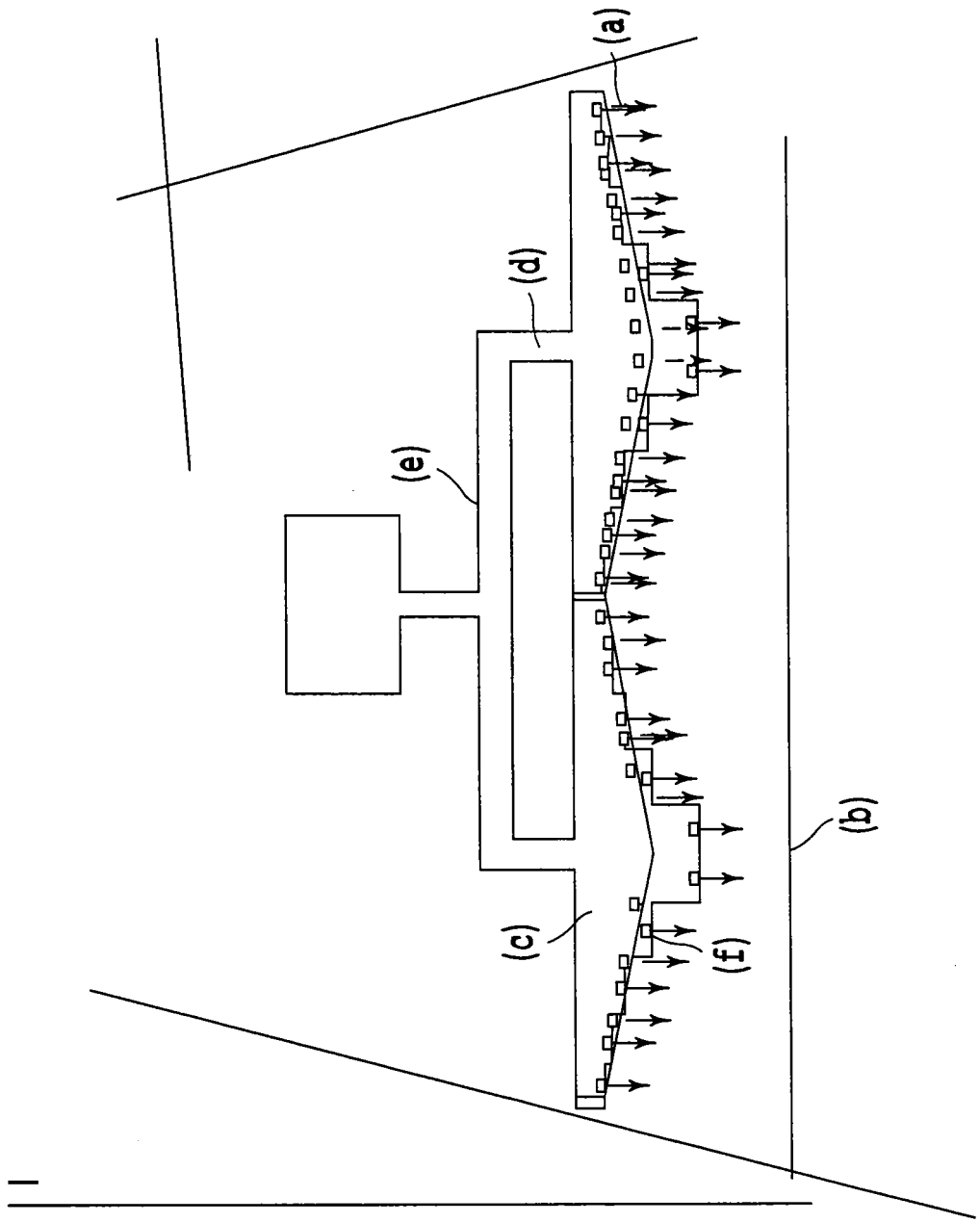

METHODS FOR PRODUCING COMPOSITE ELEMENTS BASED ON FOAMS BASED ON ISOCYANATE

The invention relates to a process for the production of composite elements composed of at least one outer layer and of a foam-forming reaction mixture, which is applied to the lower outer layer by way of at least one fixed tube having openings.

The production of composite elements in particular composed of metallic outer layers and of a core composed of isocyanate-based foams, mostly of polyurethane (PU) foams or of polyisocyanurate (PIR) foams, is widely practiced nowadays on continuously operating twin-belt systems, these elements often also being called sandwich elements. Elements for the design of façades on a very wide variety of buildings are increasingly important, alongside sandwich elements for cold-store insulation. The outer layers used here comprise not only coated steel sheet but also stainless steel sheet, copper sheet, or aluminum sheet. Particularly in the case of façade elements, the surface structure of the boundary between the foam and the outer layer is of decisive importance. For various reasons, undesired air inclusions, known as vacuoles, often occur between the lower outer layer and the isocyanate-based foam during the production of the sandwich elements. In the façade-element application, these air inclusions between metal sheet and foam can cause the metal sheet to blister and make the façades unsightly, particularly in the event of marked temperature changes and if the color shades of the outer layer are dark.

Adhesive between the insulating foam and the lower outer layer is also reduced. It is often the case that the lower outer layer in sandwich elements has the poorest adhesion, determined by the tensile test. Furthermore, the sheet metal underside is the external side of the façade in the usual designs produced using sandwich elements, and is therefore exposed to extreme conditions, examples being temperature and suction effects. It is therefore subject to greater stresses than the top side of the sandwich element, and the result of this can be separation of the foam from the metal sheet and likewise therefore blistering.

There is therefore a requirement to find a process which lastingly minimizes vacuole formation at the surface of the isocyanate-based rigid foams, or avoids this entirely, and which functions even when the production process is subject to adverse external circumstances. The process is intended to be capable of continuous or batchwise use. Batchwise operation can, for example, be used during start-up of the twin belt and for composite elements produced by means of presses operating batchwise. Continuous use takes place when twin-belt systems are used.

In the prior-art twin-belt process, the reaction mixture is prepared by machinery using high- or low-pressure technology, and is applied to the lower outer layer by means of oscillating rake applicators. The rake here is stationary in the direction of running of the belt, and oscillates across the width of the element. A disadvantage of this method of application is that any requirement for double-overlapping onto previously applied reaction mixture applies fresh material leads to application of, thus giving a mixture with different reaction states. The result of this mixture is that the foam surface produced thereby does not rise uniformly, and air is therefore included when the upper outer layer is introduced. This disadvantage becomes more marked as the time between application of the reaction mixture and the start of the foam reaction becomes shorter. The speed of the continuously operating twin belt is limited by the maximum possible oscillation speed of the mixing head. Another disadvantage is that as the amount of oscillation increases the amount of reaction mixture applied in the edge region becomes greater and that applied in the middle region of the outer layer becomes smaller.

In the alternative high-speed process, the reaction mixture is applied to the lower outer layer by way of a multi-pronged applicator, likewise including air bubbles in the reaction mixture and likewise making it impossible to produce surfaces without vacuoles. In addition, with this application method the reaction mixture has to flow laterally across relatively large regions, the result being production of relatively large vacuole zones on the lower and upper outer layer, especially in the outermost regions, before the individual strands from the multi-pronged applicator coalesce. Furthermore, it is often possible to discern a groove, or at least a defect in the foam, in the region where the strands from the multi-pronged applicator coalesce.

In order to eliminate these shortcomings, DE 197 41 523 proposes that, after application of the liquid reaction mixture for the rigid foam to the outer layer, air is blown onto the foam mixture, which is still flowable. The intention of this is to smooth the surface of the reaction mixture and to reduce the level of air-bubble inclusion. A first disadvantage here is that the blowing of air implies an additional step in the process. The blown air can moreover produce areas of greater thickness of the reaction mixture, and these likewise bring about an irregular surface.

It was then an object of the present invention to find an application process for a reaction mixture of an isocyanate-based rigid foam, in particular a PU system or PIR system, to a horizontal metal sheet or to another flexible or rigid outer layer which is continuously transported horizontally, this being the usual method for the production of sandwich elements by a continuously operating twin belt. The intention was that this lead to a surface structure improved over the prior art for the foam on the lower outer layer, and in particular to avoidance of vacuoles. The process was moreover intended to lead to better adhesion between outer layer and rigid foam. In particular, the intention was that the surface of the applied foam be uniform. The process was intended to be especially suitable for rapidly initiating systems, and the intention here was to avoid the disadvantages listed above for the multipronged applicator and for the oscillating rake applicator.

BRIEF DESCRIPTION OF THE DRAWINGS

FIG. 1 shows the inventive apparatus using two tubes c)

Surprisingly, the object was achieved in that the reaction mixture is applied to the lower outer layer b) by means of at least one fixed tube c), hereinafter also termed rake applicator, which has perforations and which has been placed, with respect to the outer layer b), so as to be parallel and at right angles to the direction of movement.

The invention therefore provides a process for the production of composites, composed of at least one outer layer b) and of an isocyanate-based rigid foam a), where the outer layer b) is moved continuously and the starting material for the isocyanate-based rigid foam a) is applied to the outer layer b), which comprises achieving the application of the liquid starting material for the isocyanate-based rigid foam a) by means of at least one fixed tube c) which has openings f) and which has been placed, with respect to the outer layer b), so as to be parallel to the plane of the outer layer and at right angles to the direction of movement.

The terms holes and perforations may be used as synonyms hereinafter.

The invention further provides an apparatus for the application of liquid reaction mixtures to an outer layer b), where the outer layer b) is moved continuously and the starting material for the isocyanate-based rigid foam a) is applied to the outer layer b), which comprises achieving the application of the liquid reaction mixture to the outer layer b) by means of at least two fixed tubes c) arranged alongside one another, which have openings f) and which have been placed so as to be parallel to the plane of the outer layer and at right angles to the direction of movement of the outer layer b).

In one preferred embodiment of the invention, the arrangement of at least two tubes c) having openings f) is in particular such that they form a straight line. It is preferable to use from 2 to 4 tubes c), particularly preferably from 2 to 3, and in particular 2.

The inventive rake applicator has, as described, a tubular shape, with holes at the underside, distributed across the entire length, and with the feed of the reaction mixture located either at one end of the tubes c) or preferably in their middle. If a plurality of tubes c) is used, the feed is preferably undertaken in the same manner for all of the tubes c).

The length of the tubes c), or the length of the tubes c) arranged alongside one another, can be the same as the width of the outer layer b). It is preferable that the length of the tube c) is smaller than the width of the outer layer b), in order to avoid application of some of the reaction mixture alongside the outer layer b). The arrangement of the rake applicator here is in the middle above the outer layer b). The rake applicator preferably covers at least 70% of the width of the outer layer b). If the width of the outer layer b) is 1.20 m, as is usual for sandwich elements, there would in this case be a width of 25 cm on each side not covered by the rake applicator. It is preferable that the rake applicator, or the rake applicators arranged alongside one another, cover(s) at least 70% of the width of the outer layer b), particularly preferably at least 80%, and in particular at least 95%.

The height of attachment of the rake with respect to the lower outer layer b) is usually from 5 to 30 cm, preferably from 10 to 30 cm, and in particular from 15 to 25 cm.

The number of the openings f) along the rake is, as a function of the length of the rake, at least 2, preferably at least 6, particularly preferably from 10 to 50, and in particular from 20 to 40. The number of the holes is preferably an even number.

The diameters of the openings f) are in the range from 0.5 to 10 mm, preferably from 1.0 mm to 4 mm. The distances between the openings f) are preferably from 5 to 200 mm, particularly preferably from 5 to 60 mm, and in particular from 10 to 30 mm. This distance, and the diameter, are preferably the same over the entire length of the tube c).

The internal diameter of the tube c) is from 0.2 to 5 cm, preferably from 0.3 to 2.5 cm, and in particular from 0.2 to 2 cm.

In one particularly preferred embodiment, the length of the openings f) differs over the length of the tube c). The length of the openings f) means the distance which the mixture a) has to travel from the interior of the tube c) until it is discharged from the tube c). Various methods can be used for this purpose. Firstly, the internal diameter of the tube c) can be altered. This is not preferred, since components of this type are difficult to produce and to clean.

It is preferable that the length of the openings f) is altered in that a metal part is placed at the underside of the tube c) in such a way that the length of the perforations is altered in the desired manner. This measure in fact changes the wall thickness of the tube c). The hole lengths, viewed from the site of the feed of the starting material for the isocyanate-based rigid foam a) to the end, do not decrease linearly, but decrease exponentially. The usual manner of prolongation of the openings f) is such that the length decreases from the feed of the mixture a) to the ends of the tube c). That means that if the mixture a) is fed in the middle of the tube c), the length of the openings f) falls in the direction toward the ends. If the mixture a) is fed at the end of the tube c) the length of the openings f) falls in the direction from the side where the feed takes place to the other side.

The selection of the length of the openings f) here is preferably such that the ratio of the length of the openings f) from the end to the middle for each tube c) is from 1.1 to 10. The ratio is particularly preferably from 2.5 to 10, in particular from 5 to 10.

If a plurality of tubes c) is used, the variation of the length of the openings f) is designed to be equal for all of the tubes c).

Each of the tubes c) having openings f) has connection to mixing equipment for the mixing of the components of the liquid starting material for the isocyanate-based rigid foam a). This is usually achieved by means of a feed d) and e) situated therebetween. The design of this feed is that of a tube, and if a plurality of tubes c) is used, each tube has connection to the feed. This can be achieved by using a tube from which in turn connection tubes run out to the tubes c). FIG. 1 shows this type of apparatus using two tubes c).

The diameter of the feeds d) is preferably constant. It is preferably from 4 to 30 mm, particularly preferably from 6 to 22 mm.

The inventive process is suitable for any of the isocyanate-based rigid foams, examples being polyurethane (PU) foams and foams having urethane groups and having isocyanurate groups, hereinafter also termed PU/PIR foams or simply PIR foams. For many applications of the composites produced by the inventive process, it is preferable that a PIR foam is used as isocyanate-based rigid foam a).

The design of the inventive process is preferably such that the amount of the liquid starting material applied to the outer layer b) for the isocyanate-based rigid foam a) is from 2 kg/min to 100 kg/min, preferably from 8 kg/min to 60 kg/min.

The viscosity of the liquid starting material for the isocyanate-based rigid foam a) is preferably from 50 mPa*s to 2000 mPa*s, particularly preferably from 100 mPa*s to 1000 mPa*s, at 25° C.

The inventive process is particularly suitable for foams where the cream time of the system is short. The cream time of the systems used for the inventive process is preferably below 15 s, with preference below 12 s, with particular preference below 10 s, and in particular below 8 s, while the fiber time of the system is from 20 to 60 s. Cream time is the time between the mixing of the polyol component and the isocyanate component and the start of the urethane reaction. The fiber time is the time from the mixing of the starting components of the foams to the juncture at which the reaction product becomes non-flowable. The fiber time is adapted appropriately as a function of the thickness of the element produced, and also the speed of the twin belt.

In one particular embodiment of the inventive process, an adhesion promoter can be applied between the outer layer b) and the isocyanate-based rigid foam a). The adhesion promoter used can comprise the adhesion promoters known from the prior art. Polyurethanes are in particular used, and it is possible here to use either reactive single-component systems or reactive two-component systems.

The adhesion promoter is applied in front of the tube c) having perforations, in the direction of movement of the outer layer b). The selection of the distance between application of the adhesion promoter and application of the starting components for the isocyanate-based rigid foam a) here is to be such that the adhesion promoter has not entirely completed its reaction before application of the starting components for the isocyanate-based rigid foam a).

The adhesion promoter can be applied to the outer layer b) by known processes, such as spraying. It is preferable that the adhesion promoter has been applied to the outer layer b) by means of a rotating flat disk which has been placed horizontally or with a slight deviation from the horizontal of up to 15°, and preferably in a manner such that it is parallel to the outer layer b). The disk can be, in the simplest case, circular, or elliptical, and flat. The design of the disk is preferably serrated or star-shaped, and the points of the star here can have an upward curve.

The disk can be completely flat, or can have upward curvature or angling at the edge. It is preferable to use a disk whose edges have upward curvature or angling. Holes are introduced into the angled portion, in order to ensure discharge of the adhesion promoter. The diameter and number of the holes are appropriately adjusted to one another, in order to permit application of the adhesion promoter in finely dispersed form to the underlying outer layer b) with maximum uniformity, and to allow discharge of all of the material applied to the disk, and to minimize the maintenance cost of the disk.

In one embodiment, the design of the disk is of cascade type. The arrangement of the cascades here rises from the axis of rotation outward. At the transitions from one cascade to the adjacent cascade, there can be holes placed within the disk, so that a portion of the adhesion promoter can be discharged at these cascade transitions onto the lower outer layer b). This type of disk designed in the manner of a cascade provides particularly uniform application of the adhesion promoter to the outer layer b) situated thereunder. The application of the adhesion promoter to the disk takes place at minimum distance from the axis of rotation. Surprisingly, it has been found here that the adhesion promoter is particularly uniformly distributed onto the lower outer layer b) if the application point of the adhesion promoter is exactly prior to or behind the axis of rotation, in parallel with the direction of production.

The diameter of the disk is, as a function of the width of the outer layer b), from 0.05 to 0.3 m, preferably from 0.1 to 0.25 m, particularly preferably from 0.12 to 0.22 m, based on the long side. Its height of attachment above the outer layer b) to which the liquid is to be applied is from 0.02 to 0.2 m, preferably from 0.03 to 0.18 m, particularly preferably from 0.03 to 0.15 m.

A disk having from 2 to 4 cascades, preferably from 2 to 3, particularly preferably 2, can be used.

This type of application apparatus for the adhesion promoter is described by way of example in WO 2006/029786.

The inventive process and the apparatus described are particularly suitable for systems using physical blowing agents, in particular pentanes. The inventive process is moreover preferred for the production of composite elements with rigid outer layers.

The outer layer b) used can comprise flexible or rigid, preferably rigid, outer layers, examples being gypsum plasterboard, glass tile, aluminum foils, aluminum sheet, copper sheet, or steel sheet, preferably aluminum foils, or aluminum sheet or steel sheet, particularly preferably steel sheet. The steel sheet can be coated or uncoated sheet. The steel sheet can be pretreated, for example using corona treatment, arc treatment, plasma treatment, or other conventional methods.

The outer layer b) is preferably transported at a constant speed of from 1 to 60 m/min, preferably from 2 to 150 m/min, particularly preferably from 2.5 to 30 m/min, and in particular from 2.5 to 20 m/min. The outer layer b) here is in a horizontal position at least from the application of the foam system b) onward, and preferably during the entire period from the application of the adhesion promoter.

In the inventive process, when using sheet and foils as outer layers, the outer layers are unwound in succession from a roll, if appropriate profiled, and heated, and if appropriate pretreated, in order to increase ease of application of polyurethane foam, and the adhesion promoter is optionally applied, the starting material for the isocyanate-based rigid foam a) is applied by means of the inventive stationary rake, and hardened in the twin-belt system, and the product is finally cut to the desired length.

The isocyanate-based rigid foams a) used for the inventive process are produced in a conventional and known manner, via reaction of polyisocyanates with compounds having at least two hydrogen atoms reactive with isocyanate groups, in the presence of blowing agents, catalysts, and conventional auxiliaries and/or additives. Details of the starting materials used are as follows.

Organic polyisocyanates that can be used are any of the known organic di- and polyisocyanates, preferably aromatic polyfunctional isocyanates.

Individual examples which may be mentioned are tolylene 2,4- and 2,6-diisocyanate (TDI) and the corresponding isomer mixtures, diphenylmethane 4,4'-, 2,4'- and 2,2'-diisocyanate (MDI) and the corresponding isomer mixtures, mixtures composed of diphenylmethane 4,4'- and 2,4'-diisocyanates, polyphenyl polymethylene polyisocyanates, mixtures composed of diphenylmethane 4,4'-, 2,4'- and 2,2'-diisocyanates and of polyphenyl polymethylene polyisocyanates (crude MDI) and mixtures composed of crude MDI and of tolylene diisocyanates. The organic di- and polyisocyanates may be used individually or in the form of mixtures.

Use is also often made of what are known as modified polyfunctional isocyanates, i.e. products obtained via chemical reaction of organic di- and/or polyisocyanates. By way of example, mention may be made of di- and/or polyisocyanates containing uretdione groups, carbamate groups, isocyanurate groups, carbodiimide groups, allophanate groups and/or urethane groups. The modified polyisocyanates may, if appropriate, be mixed with one another or with unmodified organic polyisocyanates, such as diphenylmethane 2,4'- or 4,4'-diisocyanate, crude MDI, or tolylene 2,4- and/or 2,6-diisocyanate.

Use may also be made here of reaction products of polyfunctional isocyanates with polyhydric polyols, or else of mixtures of these with other di- and polyisocyanates.

An organic polyisocyanate which has proven particularly successful is crude MDI, in particular with NCO content of from 29 to 33% by weight and a viscosity at 25° C. in the range from 150 to 1000 mPas.

Compounds which may be used and which have at least two hydrogen atoms reactive toward isocyanate groups are those which bear at least two reactive groups selected from OH groups, SH groups, NH groups, $NH_2$ groups, and acidic CH groups, preferably OH groups, and in particular polyether alcohols and/or polyester alcohols whose OH numbers are in the range from 25 to 800 mg KOH/g.

The polyester alcohols used are mostly prepared via condensation of polyhydric alcohols, preferably diols, having from 2 to 12 carbon atoms, preferably from 2 to 6 carbon atoms, with polybasic carboxylic acids having from 2 to 12 carbon atoms, e.g. succinic acid, glutaric acid, adipic acid, suberic acid, azelaic acid, sebacic acid, decanedicarboxylic acid, maleic acid, fumaric acid, or preferably phthalic acid, isophthalic acid, terephthalic acid, or the isomeric naphthalenedicarboxylic acids.

The polyesterols used mostly have a functionality of from 1.5 to 4.

Polyether polyols particularly used are those prepared by known processes, e.g. via anionic polymerization of alkylene oxides onto H-functional starter substances in the presence of catalysts, preferably alkali metal hydroxides or double-metal-cyanide catalysts (DMC catalysts).

Alkylene oxides used are mostly ethylene oxide or propylene oxide, or else tetrahydrofuran, various butylene oxides, or styrene oxide, and preferably pure propylene 1,2-oxide. The alkylene oxides can be used alone, in alternating succession, or in the form of a mixture.

Starter substances particularly used are compounds having at least 2, preferably from 2 to 8, hydroxy groups or having at least two primary amino groups in the molecule.

Starter substances used and having at least 2, preferably from 2 to 8, hydroxy groups in the molecule are preferably trimethylolpropane, glycerol, pentaerythritol, sugar compounds, such as glucose, sorbitol, mannitol, and sucrose, polyhydric phenols, resols, e.g. oligomeric condensates composed of phenol and formaldehyde, and Mannich condensates composed of phenols, of formaldehyde, and of dialkanolamines, and also melamine.

Starter substances used and having at least two primary amino groups in the molecule are preferably aromatic di- and/or polyamines, such as phenylenediamines, 2,3-, 2,4-, 3,4-, and 2,6-tolylenediamine, and 4,4'-, 2,4'-, and 2,2'-diaminodiphenylmethane, and also aliphatic di- and polyamines, such as ethylenediamine.

The preferred functionality of the polyether polyols is from 2 to 8 and their preferred hydroxy numbers are from 25 to 800 mg KOH/g, in particular from 150 to 570 mg KOH/g.

Other compounds having at least two hydrogen atoms reactive toward isocyanate are crosslinking agents and chain extenders which may be used concomitantly, if appropriate. Addition of difunctional chain extenders, trifunctional or higher-functionality crosslinking agents, or else, if appropriate, mixtures of these can prove advantageous for modification of mechanical properties. Chain extenders and/or crosslinking agents preferably used are alkanolamines and in particular diols and/or triols with molecular weights below 400, preferably from 60 to 300.

The amount advantageously used of chain extenders, crosslinking agents, or mixtures of these is from 1 to 20% by weight, preferably from 2 to 5% by weight, based on the polyol component.

The rigid foams are usually produced in the presence of blowing agents, catalysts, flame retardants, and cell stabilizers, and, if necessary, of other auxiliaries and/or additives.

Blowing agents which can be used are chemical blowing agents, such as water and/or formic acid, these reacting with isocyanate groups with elimination of carbon dioxide and, respectively, carbon dioxide and carbon monoxide. The compounds known as physical blowing agents can preferably also be used in combination with water or preferably instead of water. These are compounds inert with respect to the starting components, mostly liquid at room temperature, and evaporating under the conditions of the urethane reaction. The boiling point of these compounds is preferably below 50° C. Among the physical blowing agents are also compounds which are gaseous at room temperature and which are introduced or dissolved into the starting components under pressure, examples being carbon dioxide, low-boiling alkanes, and fluoroalkanes.

The blowing agents are mostly selected from the group consisting of alkanes, formic acid and/or cycloalkanes having at least 4 carbon atoms, dialkyl ethers, esters, ketones, acetals, fluoroalkanes having from 1 to 8 carbon atoms, and tetraalkylsilanes having from 1 to 3 carbon atoms in the alkyl chain, in particular tetramethylsilane.

Examples which may be mentioned are propane, n-butane, isobutane, cyclobutane, n-pentane, isopentane, cyclopentane, cyclohexane, dimethyl ether, methyl ethyl ether, methyl butyl ether, methyl formate, acetone, and also fluoroalkanes which can be degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane, and heptafluoropropane. The physical blowing agents mentioned may be used alone or in any desired combinations with one another.

A mixture composed of formic acid, water, and pentane is particularly preferred as blowing agent mixture.

The usual amount used of the blowing agent component is from 1 to 45% by weight, preferably from 1 to 30% by weight, particularly preferably from 1.5 to 20% by weight, and in particular from 2 to 15% by weight, based on the total weight of the following components: polyol, blowing agent, catalyst system, and any foam stabilizers, flame retardants, and other additives.

The polyurethane foams or polyisocyanurate foams usually comprise flame retardants. It is preferable to use bromine-free flame retardants. Flame retardants comprising phosphorus atoms are particularly preferred, and use is particularly made of trischloroisopropyl phosphate, diethyl ethanephosphonate, triethyl phosphate, and/or diphenyl cresyl phosphate.

Catalysts used in particular comprise compounds which markedly accelerate the reaction of the isocyanate groups with the groups reactive with isocyanate groups. Examples of these catalysts are basic amines, e.g. secondary aliphatic amines, imidazoles, amidines, and also alkanolamines, Lewis acids, or organometallic compounds, in particular those based on tin. Catalyst systems composed of a mixture of various catalysts can also be used.

If isocyanurate groups are to be incorporated in the rigid foam, specific catalysts are needed. Isocyanurate catalysts usually used are metal carboxylates, in particular potassium acetate and its solutions. The catalysts may be used alone or in any desired mixture with one another, as required.

Auxiliaries and/or additives which may be used are substances known per se for this purpose, e.g. surfactants, foam stabilizers, cell regulators, fillers, pigments, dyes, antioxidants, hydrolysis stabilizers, antistatic agents, fungistatic agents, and bacteriostatic agents.

Further details concerning the starting materials used for carrying out the inventive process, blowing agents, catalysts, and also auxiliaries and/or additives are found by way of example in Kunststoffhandbuch [Plastics Handbook], volume 7, "Polyurethane" ["Polyurethanes"] Carl-Hanser-Verlag Munich, 1st edition, 1966, 2nd edition, 1983, and 3rd edition, 1993.

To produce the rigid isocyanate-based foams a) the polyisocyanates and the compounds having at least two hydrogen atoms reactive toward isocyanate groups are reacted in amounts such that the isocyanate index for the polyurethane foams is in the range from 100 to 220, preferably from 115 to 180.

The index that can be used for operations in the production of polyisocyanurate foams can also be >180, generally from 180 to 700, preferably from 200 to 550, particularly preferably from 250 to 500, and in particular from 270 to 400.

The rigid polyurethane foams can be produced batchwise or continuously with the aid of known mixing apparatuses. Known mixing apparatuses can be used to mix the starting components.

The inventive rigid isocyanate-based foams a) are usually produced by the two-component process. In this process, the compounds having at least two hydrogen atoms reactive toward isocyanate groups are mixed with the blowing agents, with the catalysts, and also with the other auxiliaries and/or additives to give what is known as a polyol component, and this is reacted with the polyisocyanates or mixtures composed of the polyisocyanates and, if appropriate, blowing agents, also termed the isocyanate component.

The starting components are usually mixed at a temperature of from 15 to 35° C., preferably from 20 to 30° C. The reaction mixture may be mixed using high- or low-pressure feed machinery.

The density of the rigid foams produced is preferably from 10 to 400 kg/m$^3$, preferably from 20 to 200 kg/m$^3$, in particular from 30 to 100 kg/m$^3$.

The thickness of the composite elements is usually in the range from 5 to 250 mm.

A more detailed description of the invention will be given in the examples below.

EXAMPLES

A) Constitution of a PU System

Polyol Component (A Component)

44 parts of polyetherol 1 composed of propylene oxide and of an aminic starter, functionality 4, hydroxy number 400 mg KOH/g
26 parts of polyetherol 2 composed of propylene oxide and saccharose as starter, OH number 400 mg KOH/g
5 parts of polyetherol 3 composed of propylene oxide and trimethylolpropane as starter, OH number 200 mg KOH/g
20 parts of flame retardant 1: trischloroisopropyl phosphate, TCPP
2 parts of silicone-containing stabilizer
2 parts of catalyst 1: amine-containing PU catalyst
1 part of catalyst 2: amine-containing blowing catalyst
Blowing agent 1: n-pentane
Blowing agent 2: water
Blowing agent 3: 85% strength aqueous formic acid
Isocyanate Component (B Component)
  Lupranat M50 isocyanate: polymeric MDI (BASF AG), NCO content: 31%, viscosity: 500 mPas at 25° C.

A component, B component, and blowing agent were reacted in ratios such that the index was in the region of 130 and the envelope density achieved was 39 g/l.

B) Constitution of a PIR System

Polyol Component (A Component)

66 parts of polyesterol 1 composed of phthalic anhydride, diethylene glycol, and oleic acid, functionality: 1.8, hydroxy number: 200 mg KOH/g
30 parts of flame retardant 1: trischloroisopropyl phosphate, TCPP
1.5 parts of stabilizer 1, silicone-containing stabilizer
1.5 parts of catalyst 1, PIR catalyst, salt of a carboxylic acid
1 part of catalyst 2, amine-containing PU catalyst
Blowing agent 1: n-pentane
Blowing agent 2: water
Blowing agent 3: 85% strength aqueous formic acid
Isocyanate Component (B Component)
  Lupranat M50 isocyanate: polymeric MDI (BASF AG), NCO content: 31%, viscosity: 500 mPas at 25° C.

The polyol component and the isocyanate component, and also the blowing agent, were mixed with one another in ratios such that the index was in the region of 350 and the envelope density achieved was 43 g/l.

The polyurethane system and, respectively, polyisocyanurate system a) was applied in succession by means of an oscillating rake applicator and of a stationary rake applicator, composed of two equal-length tubes c) arranged in a row.

The dimensions of the oscillating rake applicator were 25 cm×1.5 cm, and it had 41 holes with diameter 1.6 mm and with a distance of 5 mm between the holes, and it oscillated with a speed of 0.7 m/s across a distance of 1.0 m.

The dimensions of the stationary rake were 95 cm×15 cm, and it had 24 holes with diameter 2.8 mm and with a distance of 40 mm between the holes. The lengths of the holes of the openings f) for each of the two tubes c) rose exponentially from the end to the middle, beginning from 3 mm, as far as 19 mm.

The application rate for both rake systems was 25.1 kg/min.

The metallic outer layer was not corona-treated. The width of the twin belt was 1.2 m and it was advanced at a constant speed of 5.0 m/min. The temperature of the metal sheet was 37° C., and that of the twin belt was set to 40° C. (PU) and, respectively, 60° C. (PIR). The thickness of the sandwich element was 100 mm.

After hardening of the system, test specimens of dimensions 100×100×5 mm were removed by sawing, and the adhesion of the foam to the outer layer was determined to DIN EN ISO 527-1/DIN 53292.

The frequency of surface defects was determined quantitatively by an optical method. For this, a plane was introduced into a foam specimen at a distance of one millimeter from the lower outer layer, i.e. from the outer layer on which the polyurethane reaction solution has been applied in the twin-belt process, and material above the plane was removed. The resultant foam surface was illuminated with an aperture angle of 5°, and the area covered by shadow due to surface defect was calculated as a ratio of the total surface area. For this, the illuminated foam surface was photographed, and the foam images were then digitized. The integrated area of the black regions of the digitized images was calculated as a ratio to the total area of the images, thus providing a measure of the frequency of surface defects. An additional qualitative assessment of surface quality was made on the foams, the outer layer being removed from a foam specimen measuring 1 m×2 m and the surface being assessed visually.

The various tests using different rigid foam systems with oscillating and stationary rake applicator are compared in table 1.

TABLE 1

Experimental parameters and results. Uniformity of application across the surface of the outer layer is assessed here.

| Example No. | Foam system | Rake system | Compressive strength [N/mm$^2$] | Compressive modulus of elasticity [N/mm$^2$] | Tensile strength [N/mm$^2$] | Tensile modulus of elasticity [N/mm$^2$] | Pattern | Number of vacuoles/surface defects |
|---|---|---|---|---|---|---|---|---|
| 1 (C) | PU | oscill. | 0.14 | 2.7 | 0.10 | 4.1 | Grooved pattern | 10% |
| 2 | PU | stationary | 0.18 | 3.4 | 0.14 | 4.5 | Flat, no pattern | 2% |
| 3 (C) | PIR | oscill. | 0.13 | 3.1 | 0.10 | 3.9 | Grooved pattern | 12% |
| 4 | PIR | stationary | 0.18 | 4.2 | 0.17 | 5.5 | Flat, no pattern | 1% |

C = comparative example

The results in table 1 show that the frequency of formation of surface defects at the boundary with the metallic outer layers is markedly reduced, in comparison with the prior art, through use of the inventive stationary rake applicator, and that the mechanical properties of the foam are improved, as also is the adhesion between rigid foam and outer layer.

The invention claimed is:

1. A process for the production of composites, comprising at least one outer layer and of an isocyanate-based rigid foam, where the outer layer is moved continuously and a liquid starting material for the isocyanate-based rigid foam is applied to the outer layer, which comprises achieving an application of the liquid starting material for the isocyanate-based rigid foam through at least one fixed tube which has openings and which has been placed, with respect to the outer layer, so as to be parallel to the plane of the outer layer and at right angles to the direction of movement,
wherein the liquid starting material for the isocyanate-based rigid foam is fed from the middle of the tube, when there is one tube, and from the middle of each tube, when there is more than one tube, and the length of the openings decreases from the middle to the ends of the, or each, tube.

2. The process according to claim 1, wherein at least two tubes whose length direction are each at right angles to the direction of movement are arranged alongside one another.

3. The process according to claim 2, wherein the arrangement of the tubes is such that their lengths form a straight line.

4. The process according to claim 1, wherein the tube(s) extend over at least 70% of the width of the outer layer, and at each of the edges of the outer layer there is a region of equal width not covered by the tube(s).

5. The process according to claim 1, wherein the tube(s) extend over at least 80% of the width of the outer layer, and at each of the edges of the outer layer there is a region of equal width not covered by the tube(s).

6. The process according to claim 1, wherein the tube(s) has been placed at a height of from 5 to 30 cm above the outer layer.

7. The process according to claim 1, wherein the diameter of the tube(s) is from 0.2 to 5 cm.

8. The process according to claim 1, wherein the internal diameter of the tube(s) remains constant from the middle to the ends of each tube.

9. The process according to claim 1, wherein a plurality of tubes is used, and where the variation of the length of the openings of each tube is the same in all of the tubes.

10. The process according to claim 1, wherein the ratio of the lengths of the openings between the site of the feed of the starting material for the isocyanate-based rigid foam and the end of each tube is from 1.1 to 20.

11. The process according to claim 1, wherein the diameter of the openings is from 0.5 to 10 mm.

12. The process according to claim 1, wherein the distance between the openings is from 5 to 200 mm.

13. The process according to claim 1, wherein the diameter of the openings is the same over the entire length of each tube.

14. The process according to claim 1, wherein the distance between the openings is the same over the entire length of each tube.

15. The process according to claim 1, wherein the number of the openings of each tube is even.

16. The process according to claim 1, wherein the number of the openings of each tube is ≥6.

17. The process according to claim 1, wherein mixing of the components of the liquid starting material for the isocyanate-based rigid foam takes place in mixing equipment which has connection by way of feeds to all of the tube(s).

18. The process according to claim 17, wherein the diameter of the feeds is constant.

19. The process according to claim 17, wherein the diameter of the feeds is from 4 to 30 mm.

20. The process according to claim 1, wherein each of the tube(s) has connection to precisely one feed.

21. The process according to claim 1, wherein each of the tube(s) has connection to mixing equipment for the mixing of the components of the liquid starting material for the isocyanate-based rigid foam.

22. The process according to claim 1, wherein the isocyanate-based rigid foam comprises isocyanurate groups.

23. The process according to claim 1, wherein the viscosity of the liquid starting material for the isocyanate-based rigid foam is from 50 mPa*s to 2000 mPa*s at 25° C.

24. The process according to claim 1, wherein the amount of the liquid starting material applied to the outer layer for the isocyanate-based rigid foam is from 2 kg/min to 100 kg/min.

25. An apparatus for the application of liquids to a layer comprising:
at least two fixed tubes arranged alongside one another and each at right angles to the direction of movement of a layer moving continuously, and which tubes have openings for application of a liquid to the layer, and which tubes have been placed so as to be parallel to the plane of the layer,
wherein each tube is adapted for receiving a feed from its middle and the length of the openings decreases from the middle to the ends of each tube.

* * * * *